United States Patent
Alfano

(10) Patent No.: US 7,558,902 B2
(45) Date of Patent: Jul. 7, 2009

(54) BUS TO MCU BRIDGE

(75) Inventor: Donald E. Alfano, Round Rock, TX (US)

(73) Assignee: Silicon Laboratories Inc., Austin, TX (US)

( * ) Notice: Subject to any disclaimer, the term of this patent is extended or adjusted under 35 U.S.C. 154(b) by 97 days.

(21) Appl. No.: 11/537,452

(22) Filed: Sep. 29, 2006

(65) Prior Publication Data

US 2008/0082716 A1 Apr. 3, 2008

(51) Int. Cl.
- G06F 13/20 (2006.01)
- G06F 13/36 (2006.01)
- G06F 13/38 (2006.01)

(52) U.S. Cl. ....................... 710/315; 710/313
(58) Field of Classification Search .............. 710/313, 710/315
See application file for complete search history.

(56) References Cited

U.S. PATENT DOCUMENTS

| | | | |
|---|---|---|---|
| 6,353,867 B1* | 3/2002 | Qureshi et al. ............. | 710/305 |
| 7,328,299 B2* | 2/2008 | Przybysz et al. ............ | 710/307 |
| 7,394,445 B2* | 7/2008 | Chapuis et al. ............. | 345/89 |
| 2004/0123164 A1* | 6/2004 | Chapuis et al. ............. | 713/300 |
| 2004/0246754 A1* | 12/2004 | Chapuis ..................... | 363/89 |
| 2005/0289373 A1* | 12/2005 | Chapuis et al. ............. | 713/300 |
| 2006/0015616 A1* | 1/2006 | Chapuis et al. ............. | 709/225 |
| 2006/0149870 A1* | 7/2006 | Sears et al. ................. | 710/71 |
| 2007/0124612 A1* | 5/2007 | Chapuis et al. ............. | 713/300 |
| 2008/0010474 A1* | 1/2008 | Chapuis ..................... | 713/300 |
| 2008/0052551 A1* | 2/2008 | Chapuis et al. ............. | 713/340 |
| 2008/0072080 A1* | 3/2008 | Chapuis et al. ............. | 713/300 |

OTHER PUBLICATIONS

Chapuis, Power-One, Inc., reference ZD-01281 revision A 00 "Z-One Intermediate Bus Architecture", SD Bus Specification, Jun. 14, 2006, pp. 1-14.

* cited by examiner

Primary Examiner—Paul R Myers
Assistant Examiner—Ryan M Stiglic
(74) Attorney, Agent, or Firm—Howison & Arnott, LLP

(57) ABSTRACT

An integrated circuit enables interconnection of a serial digital bus with a microcontroller unit. A physical interface provides for the transmission and reception of messages over the serial digital bus. A communication interface includes a serial interface for communicating with the microcontroller unit. The communication's interface further extracts clock data and information data from the received messages from the serial data bus in a format that may be transmitted to the microcontroller unit via the serial interface. The communication interface further formats data received from the serial interface into messages for transmission onto the serial digital bus. A sync timing generator generates a sync pulse for synchronizing the microcontroller unit with the serial interface of the communication interface.

19 Claims, 9 Drawing Sheets

FIG. 9

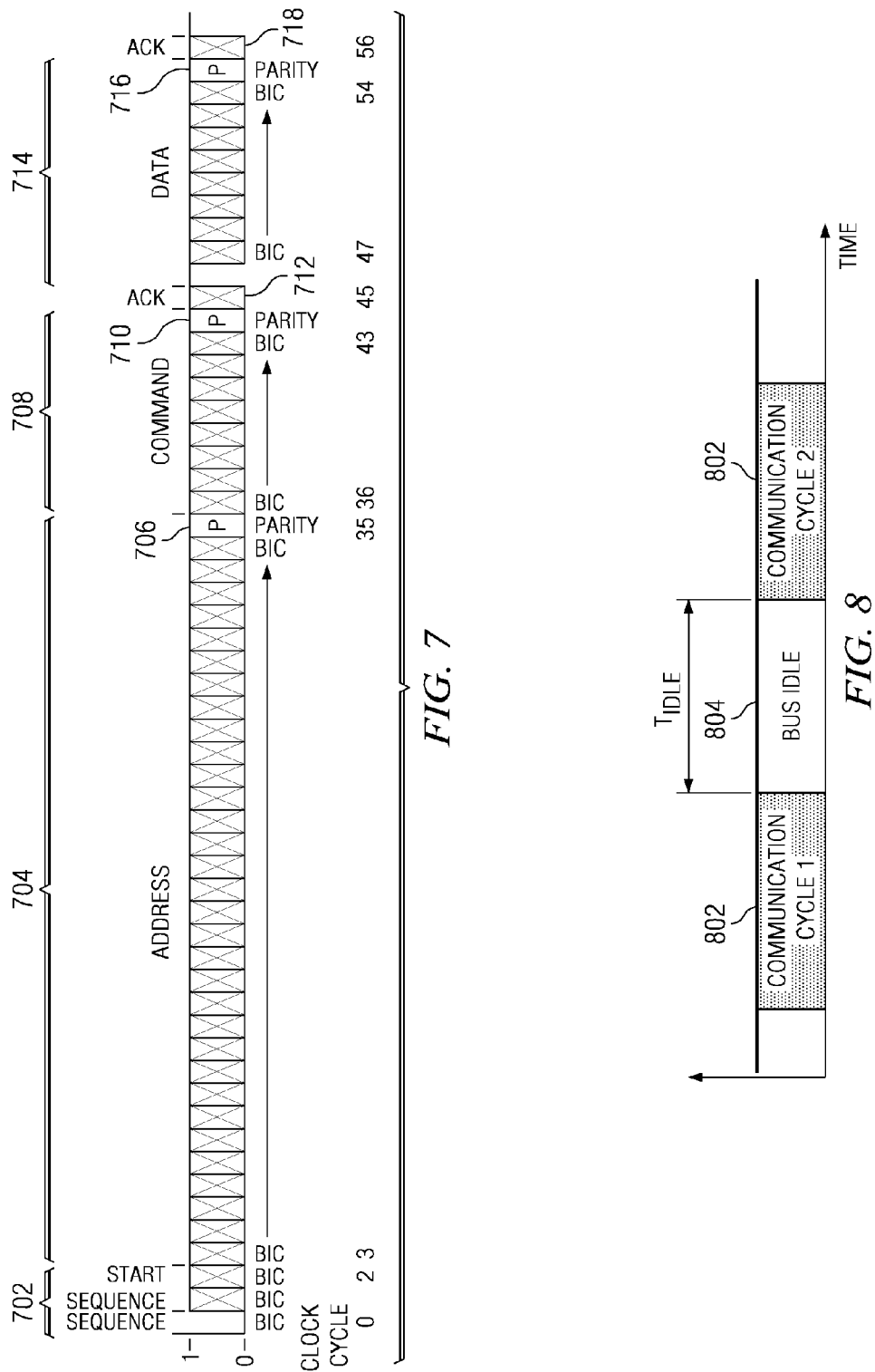

BUS TO MCU BRIDGE

TECHNICAL FIELD OF THE INVENTION

The present invention relates to a circuit for bridging communications between a data bus using a unique bus protocol and microcontroller unit (MCU), and more particularly, to an integrated circuit for bridging communications between an SD bus protocol and an MCU.

BACKGROUND OF THE INVENTION

The use of microcontroller units within integrated circuit design often requires the MCU to communicate with a variety of different protocols available over different communication busses. Most MCU units will have the ability to communicate with external sources via a UART or additionally may communicate through a SPI (Serial Peripheral Interface), I2C (Inter-Integrated Circuit bus) or other serial bus. When communicating with busses having a unique protocol such as an SD bus, the MCU is required to utilize a great deal of its processing bandwidth in order to convert between the internally used communication protocols used by either the UART or other on-board serial communications port to the unique hardware communications protocol utilized by the SD bus. This use of the processing bandwidth of the MCU obviously prevents the MCU from being used for other application specific functions. Thus, there is a need for some manner of easily converting between a communications protocol useable by the MCU and a unique protocol used by a communications bus such as an SD bus without requiring the use of large amounts of processing bandwidth by the MCU.

SUMMARY OF THE INVENTION

The present invention disclosed and claimed herein, in one aspect thereof, comprises an integrated digital circuit for interconnecting a serial digital bus with a microcontroller unit. A physical interface connects with the serial digital bus and provides for transmission and reception of messages over the serial bus, and extracting timing information from the serial bus. A communication interface includes a serial interface for communicating with the microcontroller unit. The communication interface extracts clock data and information data from messages received from the serial data bus in a format that may be transmitted to the microcontroller unit via the serial interface. The communication interface further formats data received from the serial interface into messages for transmissions over the serial digital bus. A sync timing generator enables generation of a sync pulse for synchronizing the microcontroller unit to the serial interface of the communications interface.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates a communication cycle of an SD bus;

FIG. 8 illustrates the communication cycle separation on an SD bus;

DETAILED DESCRIPTION OF THE INVENTION

Figure 1:
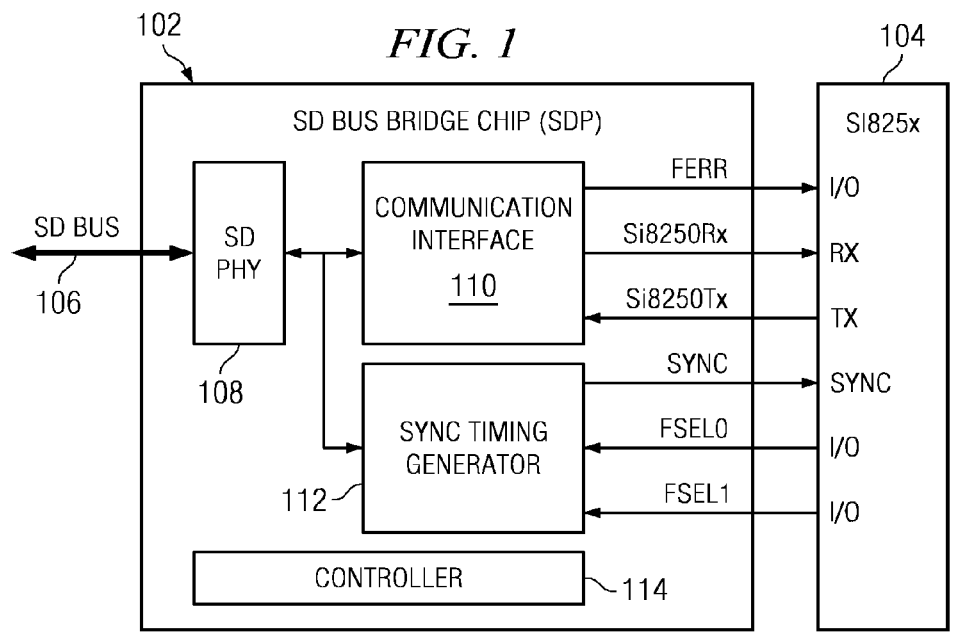
FIG. 1 is a top level block diagram illustrating the use of an SD bus bridge chip (SDB) to interconnect an MCU and an SD bus.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now more particularly to FIG. 1, there is illustrated a top level functional block diagram of the SD bus bridge chip (SDB) 102 enabling an interconnection between a microcontroller unit 104 and an SD bus 106. The SDB 102 enables the MCU to fully support SD bus communication and synchronization functions. While the present description is made with respect to the interconnecting a MCU 104 with an SD bus 106, it should be realized that the SDB 102 may act as a bridge between an MCU and any communication bus that utilizes a protocol not presently implemented within the communications structure of the MCU 104.

The SDB 102 connects directly between the SD bus 106 and the microcontroller I/O ports and requires no external components other than a local power supply bypass capacitor. The SDB 102 provides bidirectional communication translation from the SD bus communications protocol to a UART format that may be communicated to and understood by the microcontroller unit 104. This enables an SD bus communications interface with the microcontroller unit 104 using its own UART communication functionalities. The SDB 102 also provides fatal error communication detections to alert the MCU when fatal errors occur. Furthermore, the SDB 102 enables sync clock extraction from communications over the SD bus 106 and further enables frequency scaling to facilitate SD bus based system timing synchronization.

The SD physical interface 108 provides for a physical connection between the SDB 102 and the SD bus 106. It also enables the transmission of data from the SDB 102 to the SD bus 106 and for the receipt of data from the SD bus 106 to the SDB 102. The communications interface 110 provides for the extraction of data and clock information from signals received over the SD bus 106. The communications interface 110 additionally provides for the formatting of UART communications to the SD bus protocol such that this information may be transmitted over the SD bus 106 through the physical interface 108. The communications interface 110 also provides for fatal error detection.

The sync timing generator 112 is responsible for providing the extracted SD bus synchronization information from the SDB 102 to the microcontroller 104. A sync timing generator enables generation of a sync pulse for synchronizing the microcontroller unit to the serial interface of the communications interface. The frequency of a synchronization pulse provided from the sync timing generator 112 is controlled by control bits provided from the MCU 104. The control block 114 is responsible for providing the control signals to the various components of the SDB 102 responsive to state outputs received from each of these components.

Figure 2:
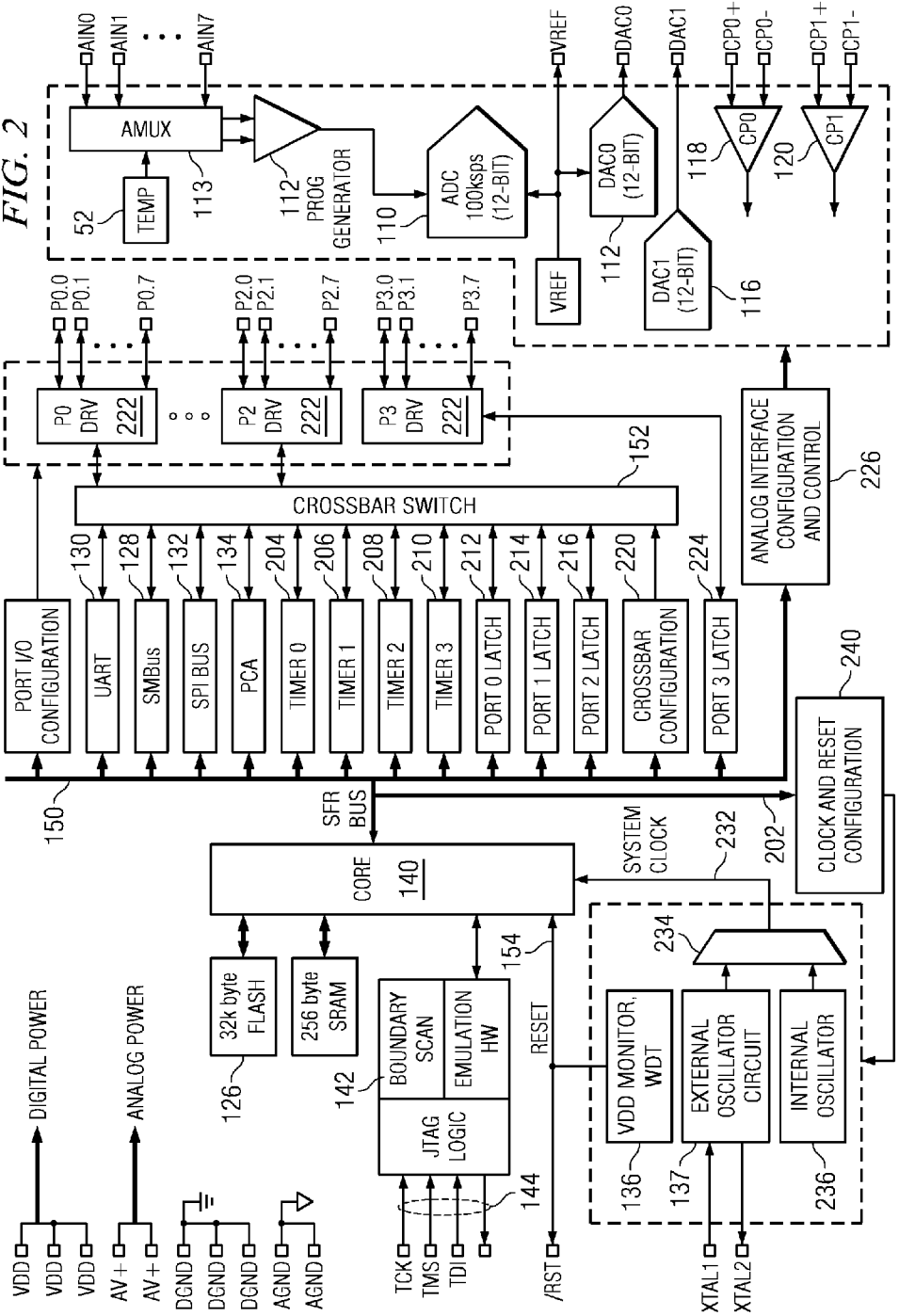
FIG. 2 is a more detailed functional block diagram of the MCU.

Referring now to FIG. 2, there is illustrated a more detailed block diagram of the MCU 104. In this embodiment, it can be seen that the cross-bar switch 152 actually interfaces to a system BUS 202 through the BUS 150. The BUS 150 is a BUS as operable to allow core 140 to interface with the various functional blocks 128-134 in addition to a plurality of timers 204, 206, 208 and 210, in addition to three latches 212, 214 and 216. The cross-bar switch 152 is configured with a configuration block 220 that is configured by the core 140. The other side of the cross-bar switch 152, the I/O side, is interfaced with various port drivers 222, which is controlled by a port latch 224 that interfaces with the BUS 150. In addition, the core 140 is operable to configure the analog side with an analog interface configuration in control block 226.

The core 140 is controlled by a clock on a line 232. The clock is selected from, as illustrated, one of two locations with a multiplexer 234. The first is external oscillator circuit 137 and the second is an internal oscillator 236. The internal oscillator circuit 236 is a precision temperature and supply compensated oscillator, as will be described hereinbelow. The core 140 is also controlled by a reset input on a reset line 154. The reset signal is also generated by the watchdog timer (WDT) circuit 136, the clock and reset circuitry all controlled by clock and reset configuration block 240, which is controlled by the core 140. Therefore, it can be seen that the user can configure the system to operate with an external crystal oscillator or an internal precision non-crystal non-stabilized oscillator that is basically "free-running." This oscillator 236, as will be described hereinbelow, generates the timing for both the core 140 and for the UART 130 timing and is stable over temperature.

Figure 3:
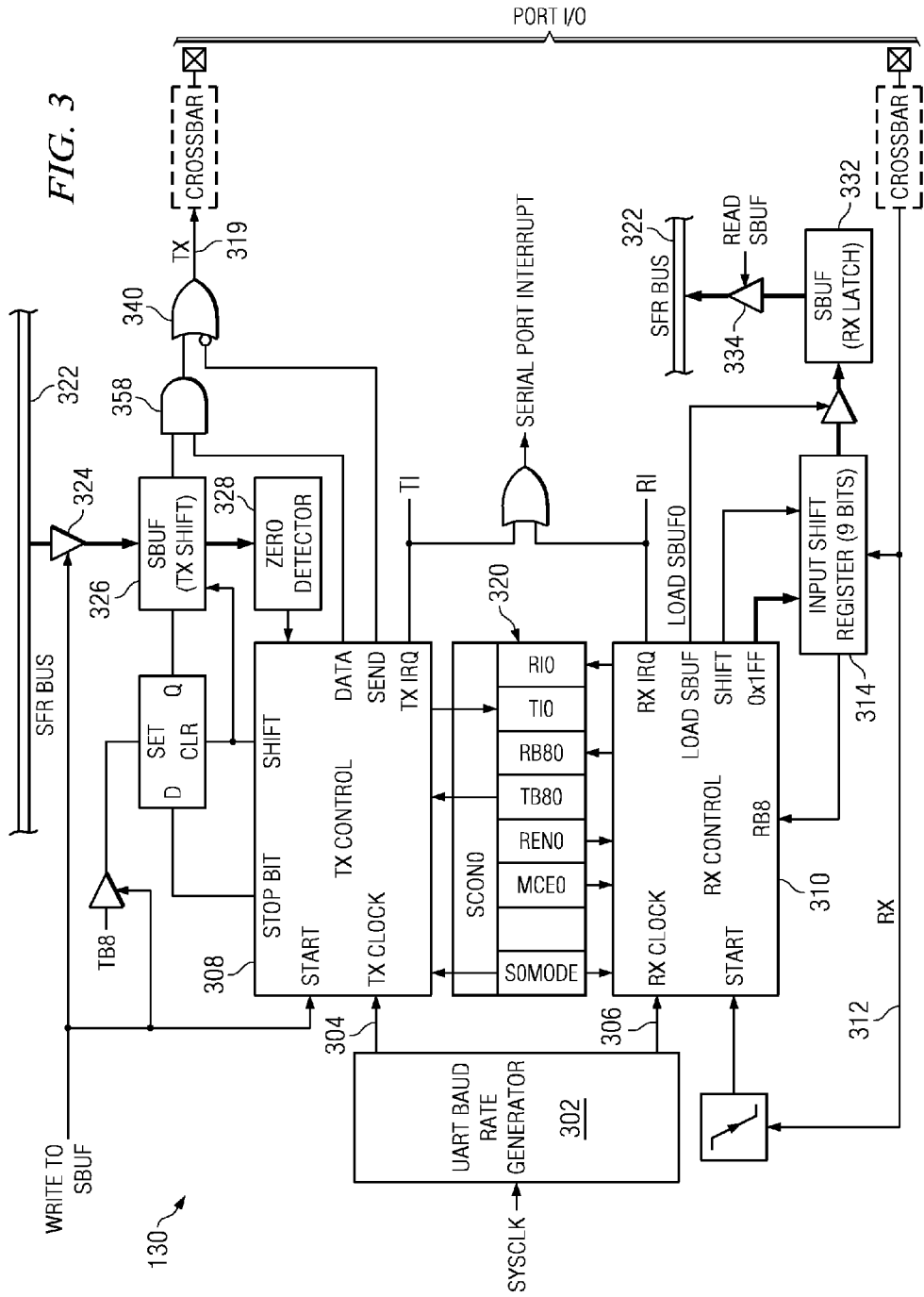
FIG. 3 is a functional block diagram of the UART implemented within the MCU and bridge chip.

Referring now to FIG. 3, there is illustrated a block diagram of the UART within the MCU 104 and SDB 102. A system clock is input to a baud rated generator 302 which provides a transmit clock on the line 304 and a receive clock on a line 306. The transmit clock is input to a transmit control block 308 and the receive clock is input to a receive control block 310. A serial control register (SCON0) 320 is provided that is operable to provide control signals to the control blocks 308 and 310. The transmit data is received from a bus 322 and is input through a gate 324 to a serial data buffer (SBUF) 326. The output of this data buffer is input to a zero detector 328 and then to a control block 308. The system is an asynchronous, full duplex serial port device and two associated special function registers, a serial control register (SCON0) 320 and a serial data buffer (SBUF0) (not shown), are provided. Data is received on a line 312 and is input to an input shift register 314. This is controlled by the control block 310 to output the shifted-in data to a latch 332 and then through a gate 334 to an SFR bus 322. In transmit mode, data is received from an SFR bus 321 and input through a gate 324 to a transmit shift register 326 which is output to a transmit line 319 from the register 326 or from the control block 308 through an AND gate 338 which is input to one input of an OR gate 340 to the transmit line 319. This is all controlled by the control block 308.

Figure 4:
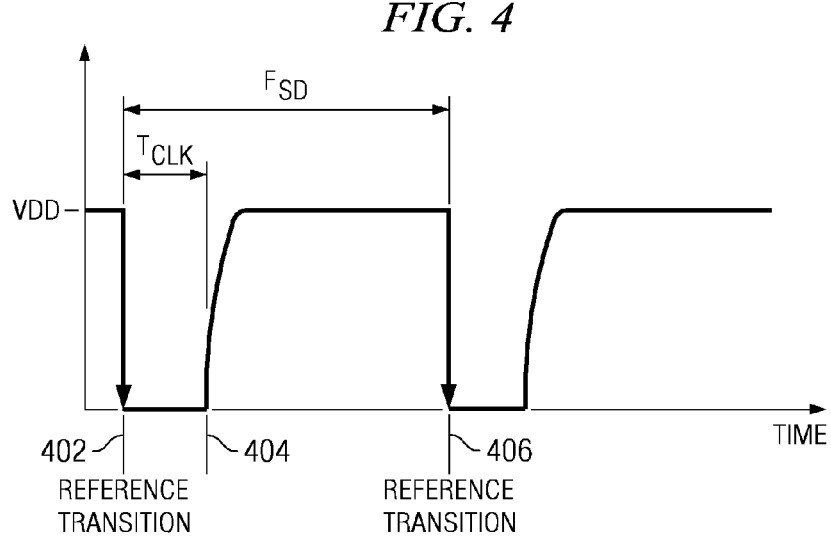
FIG. 4 is an illustration of the SD bus clock transition.

Referring now to FIGS. 4 through 8, there provided illustrations of the manner in which clock synchronization and data are transmitted by the protocol used by the SD bus 106. FIG. 4 illustrates the clock transitions of the SD bus protocol. A data transmission begins at the reference transition point 402 wherein the clock signal goes low. Once the SD clock signal goes low at 402 it is required to remain low for the SD clock low period ($T_{CLK}$) until point 404. After the clock signal has remained low for the clock low period, the data is transmitted between the end of the clock low period at 404 and the beginning of the next reference transition at 406. The period from one reference transition 402 to the next reference transition 406 is the SD bus clock frequency ($F_{SD}$).

Figure 5:
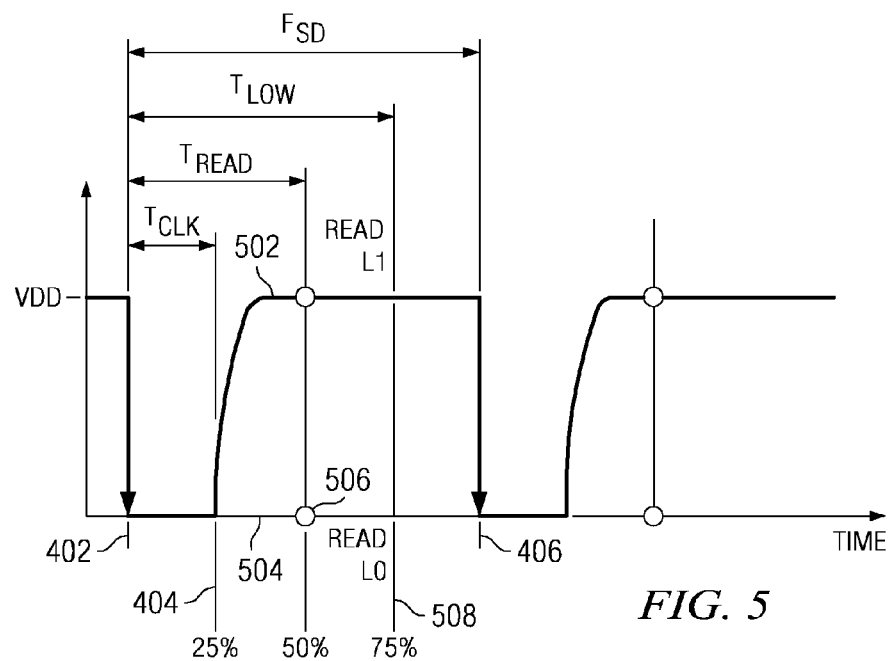
FIG. 5 illustrates a single bit transmission on an SD bus.

FIG. 5 illustrates the transmission of a single bit of information in the SD communications protocol. As described before, a data bit transmission is initiated at the transmission period 402 when the clock signal goes low and remains low for the SD clock low period ($T_{CLK}$) until point 404. The signal will then either go high to level 502 or remain low at level 504 depending upon whether a logical one bit or logical zero bit is being transmitted. The high or low state of the data bit being transmitted is read at the SD read time point ($T_{READ}$) at 506. At the $T_{READ}$ point, the value of the data bit being transmitted is determined. If the transmitted data bit is a logical zero bit, the signal must remain low until point 508. This is referred to as the SD low period ($T_{LOW}$). After the $T_{LOW}$ period, the signal must go high to enable the signal to enter the next reference transition low edge at point 406.

Figure 6:
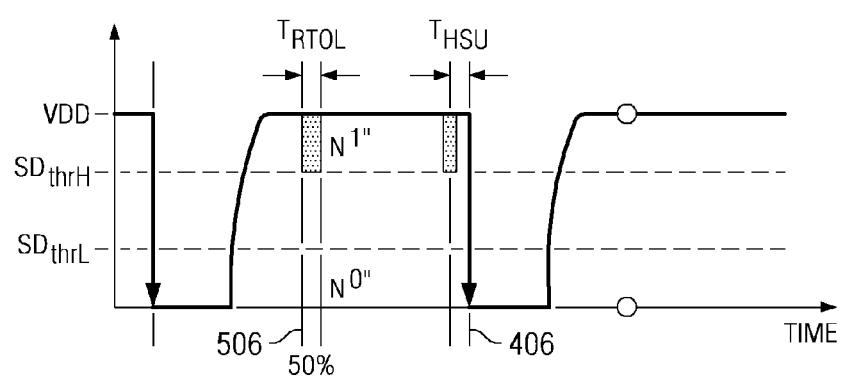
FIG. 6 illustrates SD bus read window.

FIG. 6 illustrates the SD bus read windows. The read windows represent the areas in which the logical high or logical low signal may be read to determine whether a one bit or zero bit is received. If at the read point 506 the signal is determined to be above the level $SD_{thrH}$, the signal is determined to be a logical one level. If at the read point 506 the signal is determined to be below the signal level $SD_{thrL}$, the signal is determined to be a logical zero level. The SD high set up time ($T_{hsu}$) represents the period of time that the signal on the SD bus must be high prior to the transition level occurring at 406 to begin the next data bit transmission.

Referring now to FIG. 7, there is illustrated a communication cycle of the SD bus. Each of the blocks represented in FIG. 7 illustrate the period between a first transition period 402 and a second transition period 406 as described herein above for transmitting a bit of data. The first three bits 702 represent the start sequence of bits representing the beginning of the communication cycle. The next thirty-two bits represent the address bits 704 and indicate the address to which the command and data are to be directed. The address bits 704 include a parity bit 706. The next group of bits represent the command bits 708 indicating whether the command is a read instruction, write instruction, etc. The command bits 708 also include a parity bit 710. After the command bits 708 is a first acknowledged bit 712. Next are included a number of data bits 714 comprising the data transmitted within the communication cycle. The data bits 714 also include a parity bit 716. Finally, a second acknowledgement bit 718 is attached to the end of the communication cycle after the data bits 714. The entire communication cycle includes a total of 56 bits.

Referring now also to FIG. 8, there is illustrated the separation of communication cycles upon the SD bus 106. Communication cycles 802 upon the SD bus are each separated by the SD bus idle time ($T_{idle}$) 804.

Figure 9:
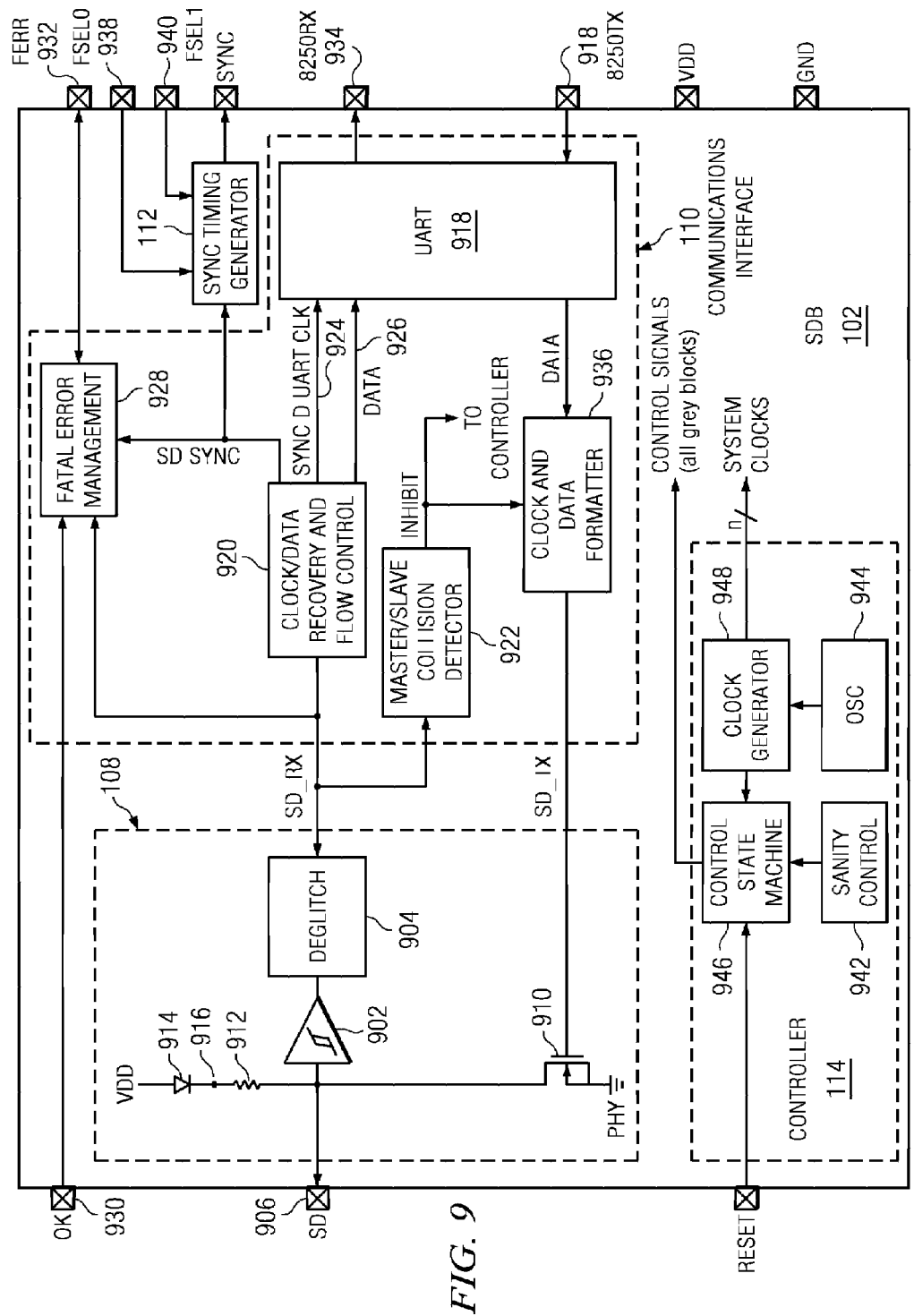
FIG. 9 is a more detailed functional block diagram of the SD bus bridge chip (SDB)

Referring now more particularly to FIG. 9, there is illustrated a detailed block diagram of the SD bus to microcontroller bridge IC 102 of FIG. 1. The responsibility of the SDB chip 102 is to convert this information transmitted upon the SD bus to data that may be utilized by the microcontroller unit 104 and additionally to translate information from the microcontroller into data that may be transmitted over the SD bus 106. As described previously with respect to FIG. 1, the SDB 102 includes the SD bus physical interface 108, the communications interface 110, the sync timing controller 112 and the controller unit 114. The physical interface 108 provides a direct connection to the SD bus 106. The physical interface 108 conforms to the requirements provided for the SD bus in the power one SD bus specification reference ZD-01281 rev. A 00 "Z-1™ Intermediate Bus Architecture," which is incorporated herein by reference.

The physical interface 108 receive path includes a buffer 902 providing hysteresis control for providing increased signal noise immunity. Signals are provided to the input of the buffer 902 through the SD pin interface 906. The output of the buffer 902 is connected to a deglitch circuit 904 that guards against glitches resulting from bus control transfer from master to slave at the 25% point of a bit cycle. The output of the deglitch circuit 904 is provided as an input to the communications interface 110.

The transmit path of the physical interface 108 receives an input from the output of the communications interface 110 at the gate of a transistor 910. The drain source path of the transistor 910 is connected between the input of buffer 902 and ground. The transistor 910 is biased by a series connection of a pull-up resistor 912 and a diode 914. The resistor 912 is connected between the input of buffer 902 and node 916. The diode 914 has its anode connected to $V_{DD}$ and its cathode connected to node 916.

The communications interface 110 transmits received SD data to the MCU 104 via a UART 918. While the present embodiment is described with respect to using a UART to communicate with the MCU 104 any serial interface including, but not limited to, a SPI, I2C, SMBus, CAN, LIN, USB, etc. The UART 918 is configured in a manner similar to that described previously with respect to FIG. 3. The communications interface 110 further transmits data received from the microcontroller unit 104 to the SD bus 106. SD signals received from the physical interface 108 are applied to the inputs of the clock/data recovery and flow control block 920 and to the master/slave collision detector 922. The clock/data recovery and flow control block 920 extracts and converts SD bus clock signals and data into a format required by the UART 918. The clock/data recovery and flow control block 920 provides the extracted clock data to the UART 918 via output line 924 and provides the extracted data from the SD signal to the UART 918 via output line 926. The clock/data recovery and flow control block 920 additionally extracts the SD sync edge for the fatal error management block 928 and for the sync timing generator 112 that uses the signal to synchronize the UART transmit clock to ensure valid data is clocked into the UART transmit buffer. The clock/data recovery and flow control block 920 additionally inhibits the synchronized UART clock when there is no SD received data present for transmission to the MCU 104.

Figure 10:
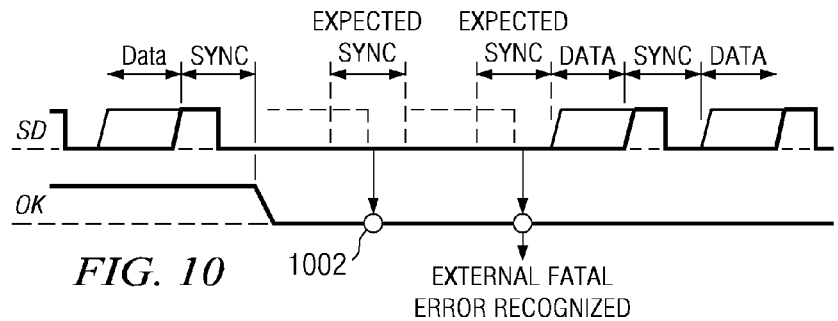
FIG. 10 is an illustration of fatal error detection within the fatal error management block of the SDB.

The fatal error management block 928 is responsible for SD bus fatal error detection/generation. SD received data from the physical interface 108 and the OK line input port 930 are monitored by the fatal error management block 928 for the absence of two consecutive negative sync slopes on the SD data signal and for the OK line going low at the end of both expected sync periods. When such a condition occurs, the fatal error management block 928 asserts the FERR pin 932 high. This notifies the MCU 104 that a fatal error condition is present. The FERR pin 932 is an open collector, bi-directional pin and is pulled up by the microcontroller unit 104 operating in a weak pull-up mode. The microcontroller unit 104 acknowledges the presence of a fatal error by pulling the FERR pin 932 low initiating the appropriate bus action. Referring now also to FIG. 10, there is illustrated the manner in which the OK signal line is pulled low responsive to failure to detect the appropriate sync pulse going low upon the SD data bus. As can be seen, when the appropriate sync pulse is not detected at 1002 the OK line goes low.

Referring now back to FIG. 9, the UART 918 transmits the data received from the clock/data recovery and flow control block 920 to the MCU 104 via the receive pin 934. Data received from the MCU UART comes in on pin 936 and is provided to the UART 918. The UART 918 forwards the received data to the clock and data formatter block 936. The clock and data formatter block 936 packages the received UART data into an SD compliant timing format for transmission over the transmit path of the physical interface 108 through transistor 910. The clock and data formatter block 936 is inhibited during a collision between master and one or more slaves responsive to a signal from the master/slave collision detector 922. The master/slave collision detector 922 monitors the SD data received from the physical interface 108 for an erroneous start sequence. When an erroneous start sequence is detected, the master/slave collision detector 922 inhibits further transmission allowing time for the master to transmit data and notify the controller 114 to force a system state change from transmit data to receive data.

The sync timing generator 112 generates MCU sync timing based upon the SD sync clock edge extracted from the SD bus signal by the clock/data recovery and flow control block 920. The sync timing generator 112 is a counter based circuit that outputs a sync pulse at programmable frequencies of 500, 750 and 1,000 kHz. The output sync pulse frequency is selected responsive to the states of the FESEL0 input 938 and FSEL1 input 940. The inputs to the FSEL0 input 938 and the FSEL1 input 940 typically are provided by the microcontroller unit 104. The counter of the sync timing generator 112 contains a one shot circuit to ensure a fixed sync pulse width regardless of the selected frequency.

The controller 114 controls the sequence of all system operations based upon state feedback from individual functional blocks. The controller 114 consists of the sanity control circuit 942, the precision oscillator 944, the clock generator 946 and a control state machine 948. The sanity control block 942 comprises a power on reset and brown out detector. This block 942 ensures that the control state machine 946 executes as designed in the event of a $V_{DD}$ glitch. It includes a $V_{DD}$ monitor with a reset pulse generator. The $V_{DD}$ monitor maintains the control state machine 046 in reset when $V_{DD}$ is below a specified minimum value. A reset pulse of specified duration is generated when $V_{DD}$ is within tolerance. Any subsequent $V_{DD}$ out of tolerance event once again holds the control state machine 946 in reset. The precision oscillator 944 and clock generator 946 generate clock signals for the system. The control state machine 948 generates the control signals to the other functional blocks of the SDB102 responsive to inputs from the blocks.

Figure 11:
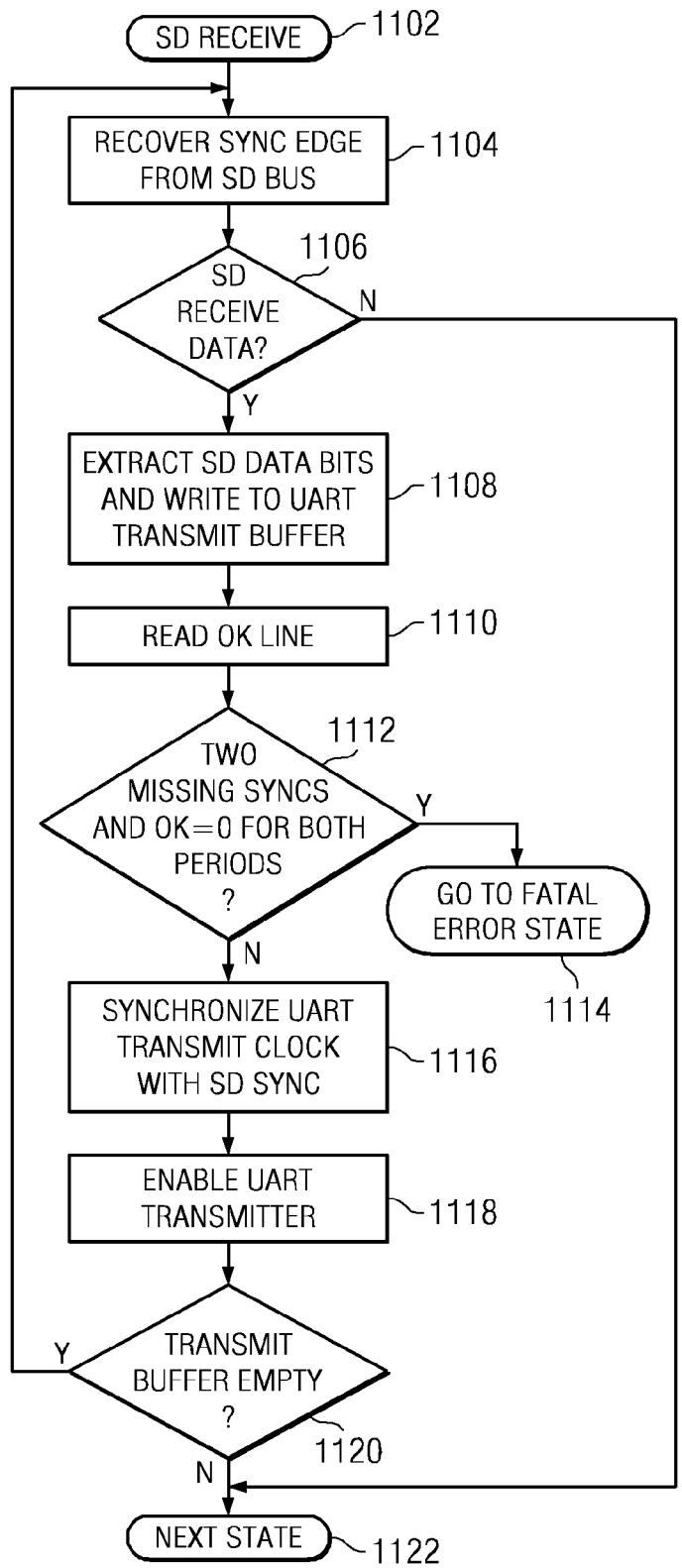
FIG. 11 is a flow diagram illustrating the operation of the receiver logic of the SDB.

Referring now to FIG. 11, there is illustrated a flow diagram of the receiver logic of the SD bridge 102. Once the SD signal is received by the physical interface 108 at step 1102. The sync edge is recovered from the received SD bus signal at step 1104 by the clock/data recovery and flow control block 920. Inquiry step 1106 determines whether data has been received, and if not, the system proceeds to the next state at step 1122. If data has been received, the data bits are extracted from the received signal and information is written to the UART transmit buffer at step 1108 by the clock/data recovery and flow control block 920. The OK line connected to port 930 is read at step 1110. Inquiry step 1112 determines if there are two missing sync pulses and the OK line has been low (logic zero) for both periods. This determination is made by the fatal error management block 928. If so, the SDB 102 enters the fatal error state at step 1114. If these conditions are determined by the fatal error management block 928 to not exist, control passes to step 1116 wherein the UART transmit clock is synchronized with the SD sync by the sync timing generator 112. The UART transmitter is enabled at step 1118 to transmit the data within the transmit buffer, and inquiry step 1120 determines whether the UART transmit buffer is empty. If so, control passes back to step 1104 to recover more data from the SD bus signal. If inquiry step 1120 determines that the transmit buffer is not empty, control passes to the next state at step 1122.

Figure 12:
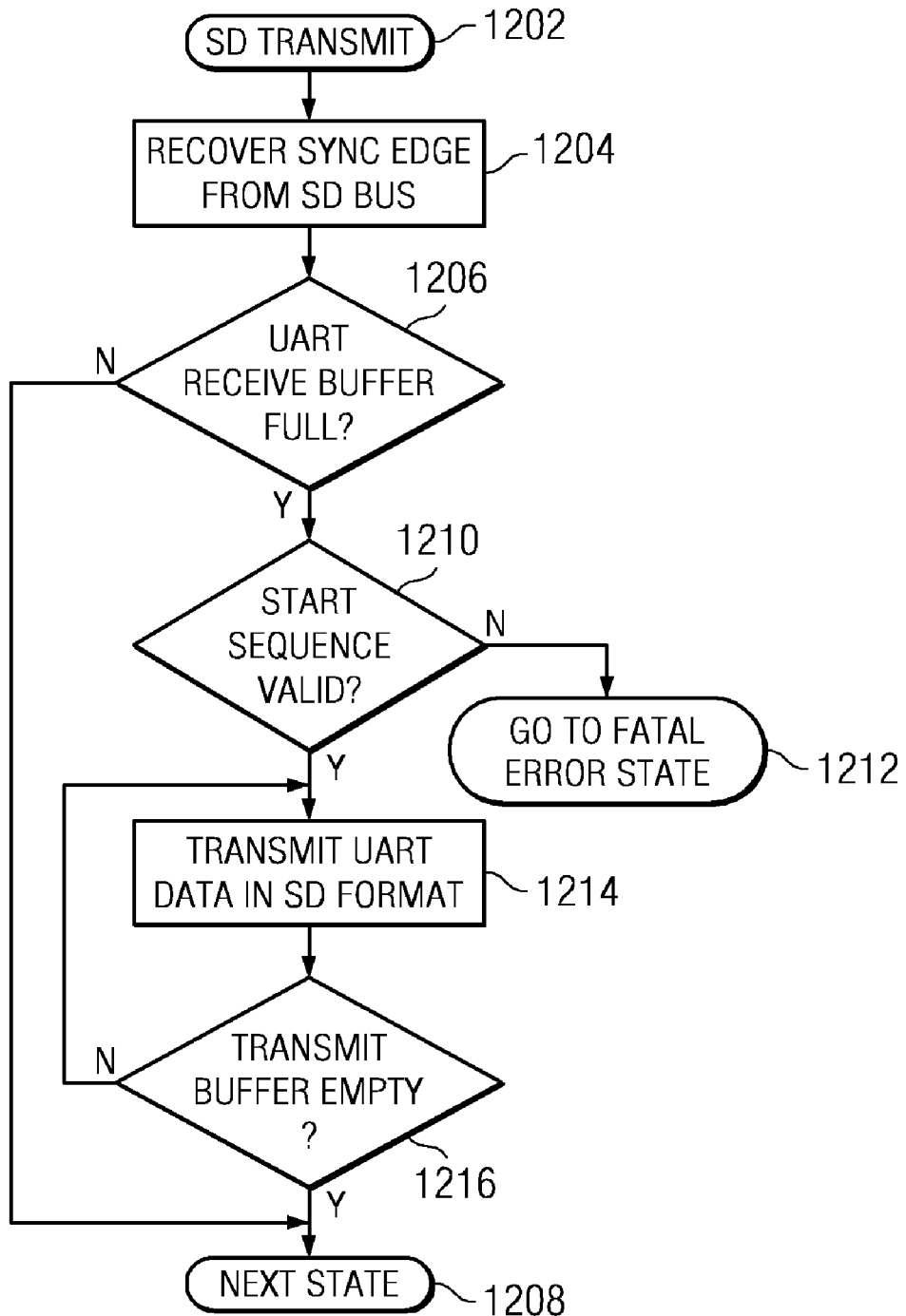
FIG. 12 is a flow diagram illustrating the transmitter logic of the SDB.

Referring now to FIG. 12, there is illustrated a flow diagram describing the transmitter logic of the SD bridge circuit 102. SD data to be transmitted is received at step 1202. The sync edge from the SD bus is recovered at step 1204. Inquiry step 1206 determines if the UART receive buffer is full. If not, the process proceeds to the next state at step 1208. If inquiry step 1206 determines that the UART receive buffer is full, inquiry step 1210 determines if the received start sequence within the received data is valid. If the start sequence is not valid, the bridge 102 proceeds to the fatal error state at step 1212. If a valid start sequence is present, the UART proceeds to transmit the data in SD format at step 1214 through the clock/data and formatter block 210 and the physical interface 108. Inquiry step 1216 determines whether the UART transmit buffer is empty. If so, control passes back to step 1214. When the UART transmit buffer is empty, the chip proceeds to the next state at step 1208.

Figure 13:
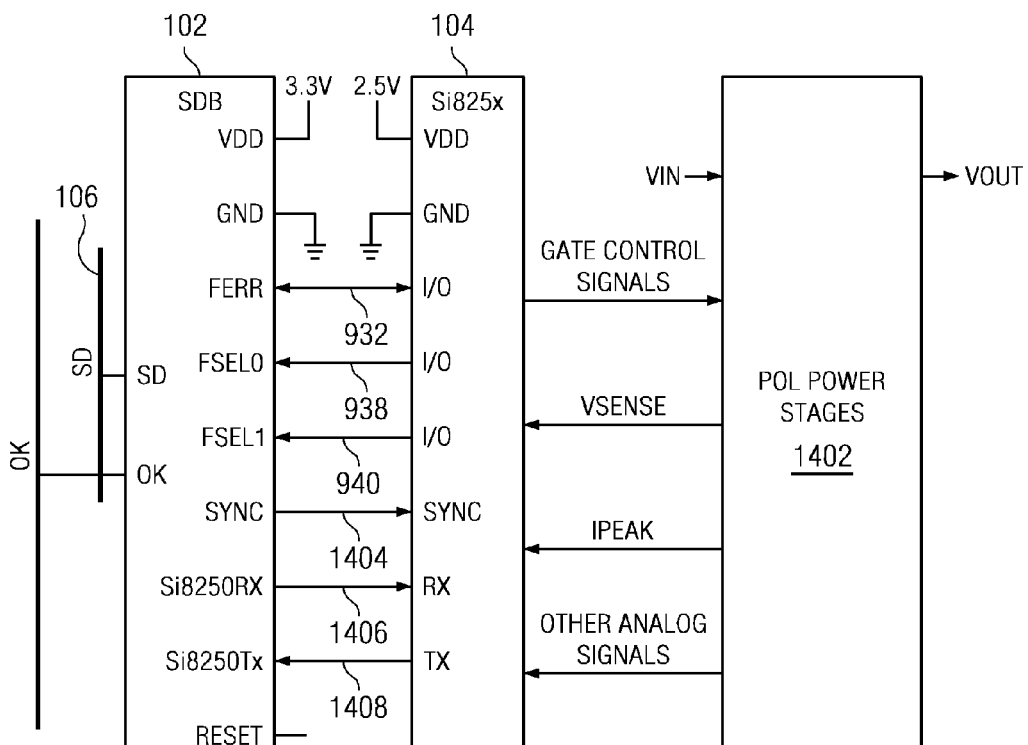
FIG. 13 illustrates the system connections of the SDB within a particular application.

Referring now to FIG. 13, there is illustrated a system application using the SD bus to MCU bridge integrated circuit 102 described herein above. FIG. 14 illustrates an MCU based Z complaint system. Six connections are required between the SDB 102 and the MCU 104 for full Z complaint operation. This consists of the fatal error connection 932 indicating detection of a fatal error condition, the frequency select pins 938 and 940 for programming the frequency of the sync pulse from the sync timing generator 112, the sync pulse output pin 1404 from the sync timing generator, the UART receive output line 1406 and the UART transmit line 1408 interconnecting the UART within the SDB 102 and the UART within the MCU 104. Although the MCU 104 is powered from 2.5 volts its I/O can be overdriven to 5 volts when operated in open collective configuration. The MCU 104 runs a real time kernel which contains functionality to process SD commands and to code communication faults and respond correctly responsive to signals from the SDB 102. The MCU 104 is operated in external sync mode whereby the start of each switching frame is initiated by a transition on the SDB sync pin 1404. The MCU 104 is connected to various point of load power stages 1402.

It will be appreciated by those skilled in the art having the benefit of this disclosure that this invention provides an interconnection between SD bus and a microcontroller unit. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. An integrated circuit for interconnecting a serial digital bus with a microcontroller unit, comprising:
    a first interface providing a physical layer connection between the integrated circuit and the microcontroller unit enabling data to be transmitted between the integrated circuit and the microcontroller unit;
    a second interface providing a physical layer connection between the integrated circuit and the serial digital bus enabling data to be transmitted between the integrated circuit and the serial digital bus;
    wherein the second interface further comprises:
        a physical interface for transmitting messages onto the serial digital bus and for receiving messages from the serial digital bus;
    wherein the first interface further comprises:
        a communication interface including a serial interface for communicating with the microcontroller unit, said communication interface further for extracting clock data and information data from the received messages from the serial digital bus in a format that may be transmitted to the microcontroller unit via the serial interface, said communication interface further for formatting data received from the serial interface into messages for transmission onto the serial digital bus;
    wherein the communications interface further comprises:
        a clock/data recovery and flow control block for extracting the clock data and the information data from the received messages from the serial data bus, for extracting a serial data sync edge from the received messages and for inhibiting the serial interface when no received messages from the serial digital bus are present;
        a clock and data formatter block for formatting data received from the serial interface into a message for transmission onto the serial digital bus; and
        a sync timing generator for generating a sync pulse for synchronizing all timing operations of the microcontroller unit with a timing provided by the serial bus.

2. The integrated circuit of claim 1, further including a master/slave collision detector for monitoring the received messages for an erroneous start sequence and inhibiting transmissions by the integrated circuit responsive to detection of the erroneous start sequence.

3. The integrated circuit of claim 1, further including a fatal error detector for monitoring the received messages for an absence of two consecutive negative sync slopes concurrent with an OK line input remaining low at an end of both expected sync periods, wherein responsive to occurrence of both of these conditions the fatal error detector drives a fatal error pin low connected to the microcontroller unit high.

4. The integrated circuit of claim 1, wherein the physical interface further includes:
    receiver circuitry for receiving messages from the serial data bus, the receiver circuitry further including:
        a buffer circuit including hysteresis control for buffering received messages from the serial data bus; and
        a deglitch circuit for protecting against glitches in the received messages on the serial data bus; and
    transmitter circuitry for transmitting messages onto the serial digital bus, the transmitter circuitry further including:
        a transistor for transmitting formatted data received from the serial interface; and
        a bias circuit for biasing the transistor.

5. The integrated circuit of claim 1, further including a controller for generation of control signals to the communications interface responsive to state feedback from the communications interface.

6. The integrated circuit of claim 5, wherein the controller further includes:
- a control state machine for generating the control signals responsive to the state feedback;
- clock circuitry for generating a clock signal for the communication interface and the sync timing generator; and
- a VDD monitor that maintains the control state machine in reset when VDD is below a selected value and generates a reset pulse when VDD is above the selected value.

7. The integrated circuit of claim 1, wherein the serial interface comprises at least one of a UART (Universal Asynchronous Receiver Transmitter), a SPI (Serial Peripheral Interface), I2C (Inter-integrated Circuit), SMBus (System Management Bus), CAN (Controller Area Network), LIN (Local Interconnect Network), and USB (Universal Serial Bus) interface.

8. An integrated circuit for interconnecting a serial digital bus with a microcontroller unit, comprising:
- a physical interface for transmitting messages onto the serial digital bus and for receiving messages from the serial digital bus;
- a serial interface for communicating with the microcontroller unit;
- a clock/data recovery and flow control block for extracting clock data and information data from received messages from the serial digital bus in a format that may be transmitted to the microcontroller unit via the serial interface and for further extracting a serial data sync edge from the received messages and for inhibiting the serial interface when no received messages from the serial digital bus are present;
- a clock and data formatter block for formatting data received from the serial interface into a message for transmission onto the serial digital bus;
- a sync timing generator for generating a sync pulse for synchronizing all timing operations of the microcontroller unit with a timing provided by the serial bus; and
- a controller for generation of control signals to the serial interface, the clock/data recovery and flow control block and the clock and data formatter block responsive to state feedback from the serial interface, the clock/data recovery and flow control block and the clock and data formatter block.

9. The integrated circuit of claim 8, further including a master/slave collision detector for monitoring the received messages for an erroneous start sequence and inhibiting transmissions by the integrated circuit responsive to detection of the erroneous start sequence.

10. The integrated circuit of claim 8, further including a fatal error detector for monitoring the received messages for and absence of two consecutive negative sync slopes concurrent with an OK line input remaining low at an end of both expected sync periods, wherein responsive to occurrence of both of these conditions the fatal error detector drives a fatal error pin low connected to the microcontroller unit high.

11. The integrated circuit of claim 8, wherein the physical interface further includes:
- receiver circuitry for receiving messages from the serial data bus, the receiver circuitry further including:
  - a buffer circuit including hysteresis control for buffering received messages from the serial data bus; and
  - a deglitch circuit for protecting against glitches in the received messages on the serial data bus; and
- transmitter circuitry for transmitting messages onto the serial digital bus, the transmitter circuitry further including:
  - a transistor for transmitting formatted data received from the serial interface; and
  - a bias circuit for biasing the transistor.

12. The integrated circuit of claim 8, wherein the controller further includes:
- a control state machine for generating the control signals responsive to the state feedback;
- clock circuitry for generating a clock signal for the communication interface and the sync timing generator; and
- a VDD monitor that maintains the control state machine in reset when VDD is below a selected value and generates a reset pulse when VDD is above the selected value.

13. The integrated circuit of claim 8, wherein the serial interface comprises at least one of a UART (Universal Asynchronous Receiver Transmitter), a SPI (Serial Peripheral Interface), I2C (Inter-integrated Circuit), SMBus (System Management Bus), CAN (Controller Area Network), LIN (Local interconnect Network), and USB (Universal Serial Bus) interface.

14. A system, comprising:
- a serial digital bus for transmitting and receiving data using a unique communications protocol;
- a microcontroller unit for transmitting and receiving messages via a serial interface; and
- an integrated circuit for interconnecting the serial digital bus with the microcontroller unit, including:
  - a physical interface for transmitting messages onto the serial digital bus and for receiving messages from the serial digital bus using the unique communications protocol;
  - a second serial interface for communicating with the serial interface of the microcontroller unit;
  - a clock/data recovery and flow control block for extracting clock data and information data from received messages from the serial digital bus in a format that may be transmitted to the microcontroller unit via the serial interface and for further extracting a serial data sync edge from the received messages and for inhibiting the second serial interface when no received messages from the serial digital bus are present;
  - a clock and data formatter block for formatting data received from the serial interface into a message in the unique communications protocol for transmission onto the serial digital bus and for further extracting a serial data sync edge from the received messages and for inhibiting the serial interface when no received messages from the serial digital bus are present;
  - a sync timing generator for generating a sync pulse for synchronizing the serial interface of the microcontroller unit with the second serial interface; and
  - a controller for generating of control signals to the second serial interface, the clock/data recovery and flow control block and the clock and data formatter block responsive to state feedback from the second serial interface, the clock/data recovery and flow control block and the clock and data formatter block.

15. The integrated circuit of claim 14, further including a master/slave collision detector for monitoring the received messages for an erroneous start sequence and inhibiting transmissions by the integrated circuit responsive to detection of the erroneous start sequence.

16. The integrated circuit of claim 14, further including a fatal error detector for monitoring the received messages for and absence of two consecutive negative sync slopes concurrent with an OK line input remaining low at an end of both expected sync periods, wherein responsive to occurrence of both of these conditions the fatal error detector drives a fatal error pin low connected to the microcontroller unit high.

17. The integrated circuit of claim 14, wherein the physical interface further includes:
 receiver circuitry for receiving messages from the serial data bus, the receiver circuitry further including:
  a buffer circuit including hysteresis control for buffering received messages from the serial data bus; and
  a deglitch circuit for protecting against glitches in the received messages on the serial data bus; and
 transmitter circuitry for transmitting messages onto the serial digital bus, the transmitter circuitry further including:
  a transistor for transmitting formatted data received from the second serial interface; and
  a bias circuit for biasing the transistor.

18. The integrated circuit of claim 14, wherein the controller further includes:
 a control state machine for generating the control signals responsive to the state feedback;
 clock circuitry for generating a clock signal for the communication interface and the sync timing generator; and
 a VDD monitor that maintains the control state machine in reset when VDD is below a selected value and generates a reset pulse when VDD is above the selected value.

19. The integrated circuit of claim 14, wherein the serial interface and the second serial interface comprise at least one of a UART (Universal Asynchronous Receiver Transmitter), a SPI (Serial Peripheral Interface), I2C (Inter-integrated Circuit), SMBus (System Management Bus), CAN (Controller Area Network), UN (Local Interconnect Network), and USB (Universal Serial Bus) interface.

\* \* \* \* \*